United States Patent [19]
Brusewitz

[11] Patent Number: 5,452,103
[45] Date of Patent: Sep. 19, 1995

[54] METHOD AND A DEVICE FOR IMAGE CODING

[75] Inventor: Harald Brusewitz, Älvsjö, Sweden

[73] Assignee: Televerket, Farsta, Sweden

[21] Appl. No.: 964,032

[22] Filed: Oct. 21, 1992

[30] Foreign Application Priority Data

Nov. 15, 1991 [SE] Sweden ................. 9103380

[51] Int. Cl.⁶ ............................................. H04N 1/41
[52] U.S. Cl. ................................... 358/261.2; 358/313;
358/404; 348/419
[58] Field of Search ................ 358/350, 351, 310, 313,
358/524, 539, 404, 426, 426.1, 426.2, 444;
375/31; 348/390, 412, 415, 419

[56] References Cited

U.S. PATENT DOCUMENTS

| | | |
|---|---|---|
| 3,670,096 | 6/1972 | Candy et al. . |
| 3,895,184 | 7/1975 | Komura et al. . |
| 4,047,221 | 9/1977 | Yasuda et al. . |
| 4,051,530 | 9/1977 | Kuroda et al. . |
| 4,672,441 | 6/1987 | Hoelzlwimmer et al. . |
| 4,780,760 | 10/1988 | Waldman et al. . |
| 4,788,589 | 11/1988 | Kondo . |
| 4,970,591 | 11/1990 | Ohki . |
| 5,126,842 | 6/1992 | Andrews et al. . |
| 5,164,828 | 11/1992 | Tahara et al. . |
| 5,241,401 | 8/1993 | Fujiwara et al. . |
| 5,253,054 | 10/1993 | Fujiwara et al. . |

FOREIGN PATENT DOCUMENTS

0396846 11/1990 .

Primary Examiner—Bentsu Ro
Attorney, Agent, or Firm—Oblon, Spivak, McClelland, Maier, & Neustadt

[57] ABSTRACT

The invention relates to a method and a device for image coding having a particular, but not necessarily an exclusive, application in the transmission of video signals. The video signal is converted to a bit stream by coding and quantising and stored in a buffer store before it is transmitted on a transmission line at a constant bit rate. Problems experienced with the known technology have been the prevention of overflow in the buffer store and the buffer store being emptied prematurely. Both of these problems give rise to a deterioration in image quality. At the same time, the content of the buffer store should be as small as possible. According to the invention, not all the frames are coded and transmitted, but a certain number (k) of frames are skipped between each coded frame. The number k is based on the transmission rate R, the frame rate fo of the video signal and minimum value (bR/fo) set for the content of the buffer store. The number of skipped frames is selected so that the buffer store is not emptied below the set lower limit before the next frame is coded. The buffer store content is also regulated by skipping or setting to zero certain components in the bit stream from the coder core. The actual and ideal buffer store contents are determined and selected components of the bit stream are set to zero in dependence on the difference between the actual and the ideal content values. The invention also relates to a device for carrying out the method. The device is preferably constructed as a VLSI circuit.

20 Claims, 3 Drawing Sheets

METHOD AND A DEVICE FOR IMAGE CODING

BACKGROUND OF THE INVENTION

The invention relates to a method and a device for image coding having a particular, but not necessarily an exclusive, application in the transmission of video signals, for example in video telephone systems.

In order to obtain good quality signals for such use, the video signal is converted into a digital signal. The format of the digital signal is specified by the International Consultative Committee for Telegraphs and Telephones (CCITT) H.261 standard. However, the method of digitisation of the video signal can be selected independently by the user.

The transmission of a digital signal is normally carried out with the aid of a number of circuits which are frequently divided into a video input signal section, a coder core and a video multiplexer (VMUX). The video input signal section effects suitable signal processing of the video input signal. The coder core effects some form of transformation coding of the signal which can be predictive (INTER) or non predictive (INTRA). After the transformation coding, the signal is quantised.

The digital bit stream is then subjected to further code processing by the VMUX in order to effect compression of the bit stream. Traditionally, run length coding, variable length coding and error correction are also effected. The operation of the VMUX is normally effected by means of a signal processor. Since these codings produce different numbers of bits per frame and the bit rate on the transmission line at the output of the image coding is constant, the VMUX contains a buffer store.

Problems experienced with the known technology relate to the prevention of overflow in the buffer store and the buffer store being emptied prematurely. Both of these problems give rise to a deterioration in image quality. At the same time, the content of the buffer store should be as small as possible.

It is an object of the present invention to overcome the foregoing problems by arranging for the buffer store content to be regulated by skipping the coding of a number of flames and/or by setting to zero certain components in the bit stream.

SUMMARY OF THE INVENTION

The invention provides a method for image coding a video signal having a known frame rate comprising coding and quantising the video signal to effect digitisation and compression of the signal to form a bit stream having a bit rate determined by the transmission line on which the bit stream is to be transmitted, storing the bit stream in a buffer store before transmission, monitoring the buffer store content, sensing the rate of the bit stream at the output of the buffer store, calculating the ideal buffer store content, and setting to zero selected components of the bit stream at the output of the quantiser in dependence on the difference between the values of the monitored and ideal buffer store contents and/or skipping a number of frames between each coded frame, the number of skipped frames being selected so that the content of the buffer store is not reduced to a level below a selected lower limit before the next frame is coded.

The invention also provides a device for image coding of a video signal having a known frame rate in accordance with the foregoing method.

The invention further provides a video system including a device which operates in accordance with the image coding method according to the present invention.

The device is preferable constructed in the form of an integrated circuit, for example, a VLSI circuit.

The foregoing and other features according to the present invention will be better understood from the following description with reference to the accompanying drawings, in which:

BRIEF DESCRIPTION OF THE PRIOR ART

Figure 1:
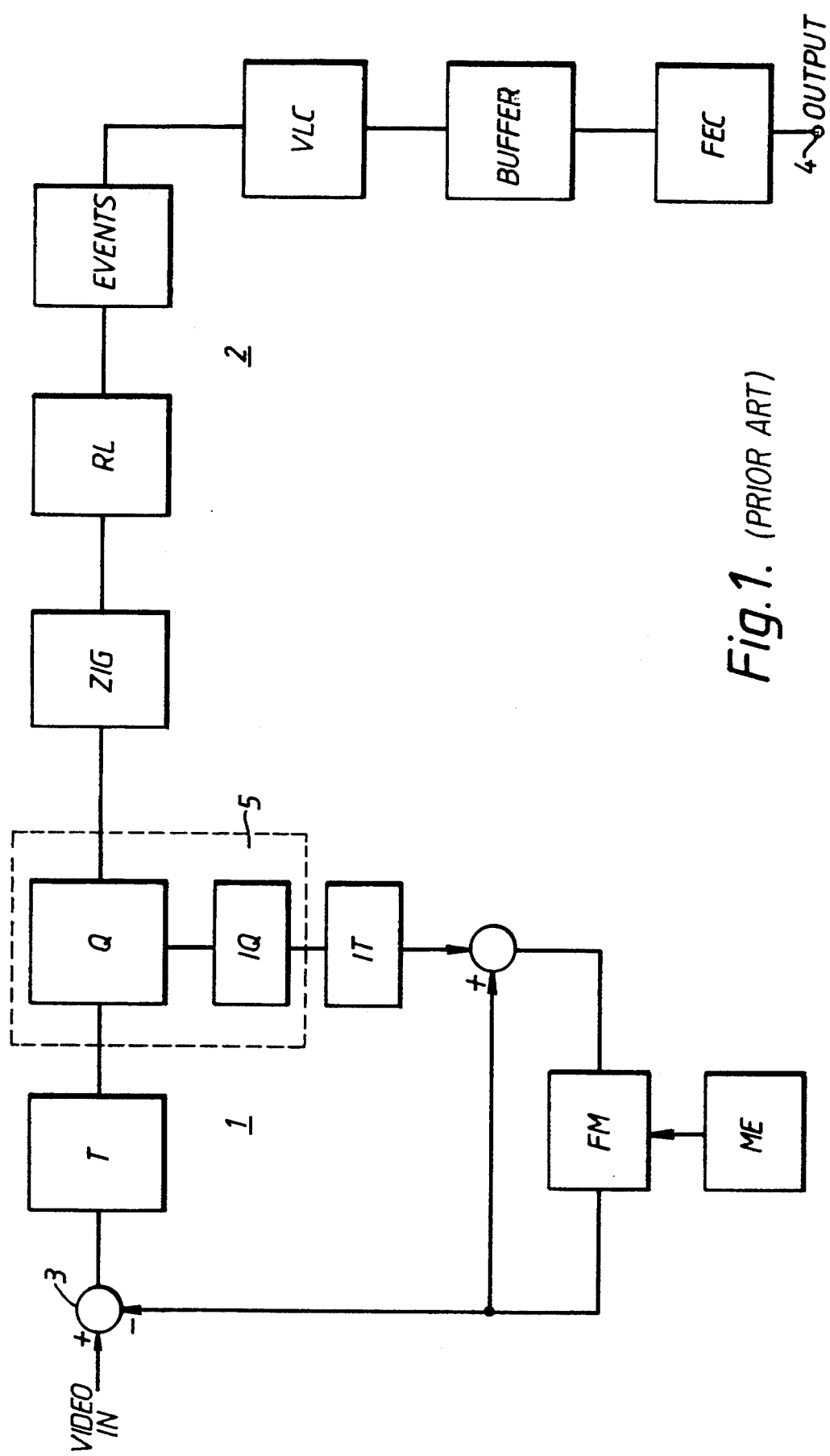
FIG. 1 illustrates in the form of a block diagram a known coder core and a VMUX.

The basic design of a known image coding device is illustrated in FIG. 1 of the drawings and comprises a coder core 1 and a VMUX 2. A video signal with a frame rate fo which has been processed by a limiter or other input circuit (not illustrated) is applied to the input of the coder core 1. The input signal is applied to a transformation coder T via a subtraction circuit 3. The signal is transformed by the coder T and then quantised in a quantiser Q. The coder core 1 normally utilises some form of predictive coding for the frame which is subtracted from the video signal by means of the subtraction unit 3. Inverse quantisation and inverse transformation are then respectively effected by means of an inverse quantiser IQ and an inverse transformation coder IT. A frame memory FM and possibly also a motion estimator ME are utilised in the prediction.

The output of the coder core 1 i.e. an output of the quantiser Q, is connected to the input of the VMUX 2 which comprises a zig-zag scanning arrangement, ZIG, the input of which forms the input of the VMUX, a run length coding arrangement, RL, an arrangement, EVENTS, which supports the run length coding, a variable-length coding arrangement, VLC, a buffer store and an error correction arrangement, FEC, which are connected in cascade and which operate in a manner that is well known by persons skilled in the art.

In the VMUX, the signal is processed in a manner whereby it can be sent as economically as possible on a transmission line (not illustrated) that would normally be connected at one end thereof to the output 4 of the FEC and at the other end thereof to a receiver. The signal must also be adapted to the bit rate R on the transmission line. The bit rate of the signal is derived from a clock at the output 4 of the FEC.

The operation of the VMUX is normally effected by means of a programmed signal processor.

Figure 2:
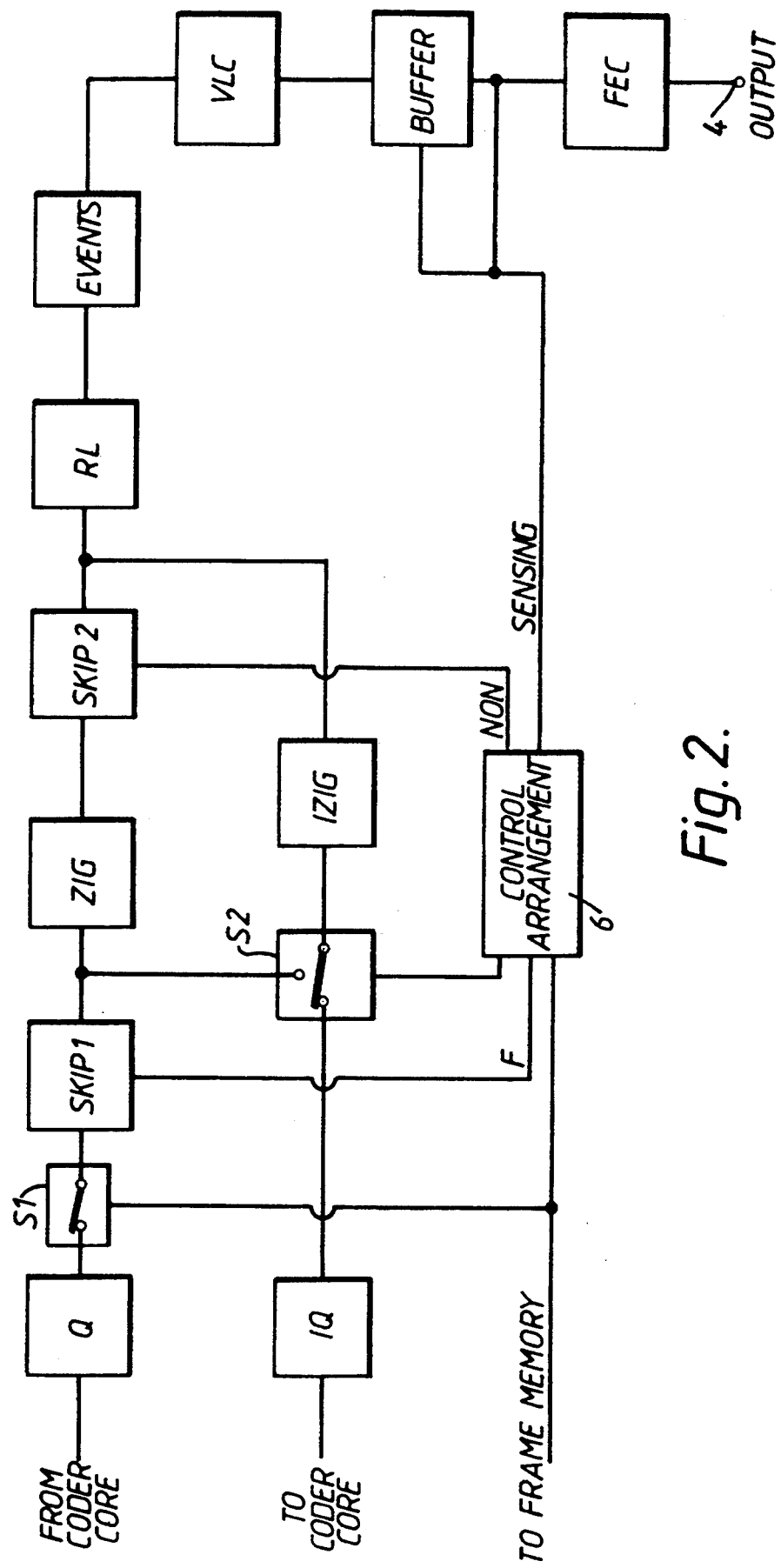
FIG. 2 illustrates in the form of a block diagram an image coding device according to the present invention.

In practice, the quantisers 5 may form part of either the coder core 1 or the VMUX 2. In the preferred embodiment of the present invention, as is illustrated in FIG. 2 of the drawings, the quantisers 5 are included in the VMUX but they could be by-passed in such a manner that the VMUX could optionally be used together the coder cores either with or without quantisers.

The function of the buffer store is to release bits at a clock rate which is controlled by the bit rate on the transmission line. Since the coding of the video signal produces a different numbers of bits per frame depending, amongst other things, on the content of the frame, the buffer store content can vary. It is important to ensure that the buffer store does not overflow because this would result in the information on the frames being irretrievably lost. Furthermore, the buffer store content should be as small as possible in order to reduce delay, that is to say, the time during which the bits are stored in the buffer store. It should also to be ensured that the buffer store rarely becomes empty because it would then become necessary to stuff redundant bits into the bit stream and this would give rise to a deterioration in the quality of the image.

The format of the bit stream is given by the CCITT standard referred to above. One frame consists of twelve block groups which are designated as GOB and each block group consists of 33 macroblocks which are designated as MB. The frame rate fo of the video signal at the input of the image coding device is generally 30 Hz.

DESCRIPTION OF THE PREFERRED EMBODIMENT

With the embodiment of the present invention, as illustrated in FIG. 2 of the drawings, the content B of the buffer store is controlled by skipping a number (k) of frames. In other words a number of frames of the 30 input signals are skipped and are, therefore, not coded.

If k frames are skipped, then the frame rate at the output of the image coding device will be fo/(1+k). Thus, for the video signal frame rate referred to above, the output frame rate would be 30/(1+k).

In determining the number of flames that can be skipped, account must be taken of a number of different factors. For example, it may not be possible for the decoder in the receiver to decode flames at very high clock rates, in which case, a certain number of flames k0 would have to be skipped. It can be desirable from the point of view of coding to keep the speed low at the output of the image coding device since there must be a sufficient number of bits per frame for good image quality. This depends on the bit rate at the output of the image coding device which is normally 64 kbit/s. If no flames are to be skipped, then the bit rate of 30 Hz will be obtained at the output. This will provide approximately 2000 bits per frame, which will require quite a course quantisation in the quantiser Q and will provide a noisy image.

The image coding device according to the present invention includes a control arrangement 6 which, as is illustrated in FIG. 2 of the drawings, senses not only the buffer store content B but also the bit rate R at the output of the buffer store. The control arrangement 6 controls the operation of a switch S1 which is interposed between the output of the quantiser Q and a unit which is designated SKIP 1 and which is adapted to effect the removal from the video signal of a desired number of flames.

The control arrangement 6 also controls the operation of a switch S2 and the zero setting arrangements of the unit SKIP 1 and a unit which is designated SKIP 2. As is illustrated in FIG. 2, the switch S2 is adapted to connect either the unit SKIP 1 or the inverse quantiser IQ to the junction of the units SKIP 2 and RL via a unit which is designated IZIG.

In order to maintain the correctness of the coder core prediction referred to above, it is necessary for information concerning the number of skipped frames to be sent to the frame memory in the coder core 1. This is effected by the control arrangement 6 sending a control signal indicative of the number of skipped frames, to the frame memory in the coder core 1.

Figure 3:
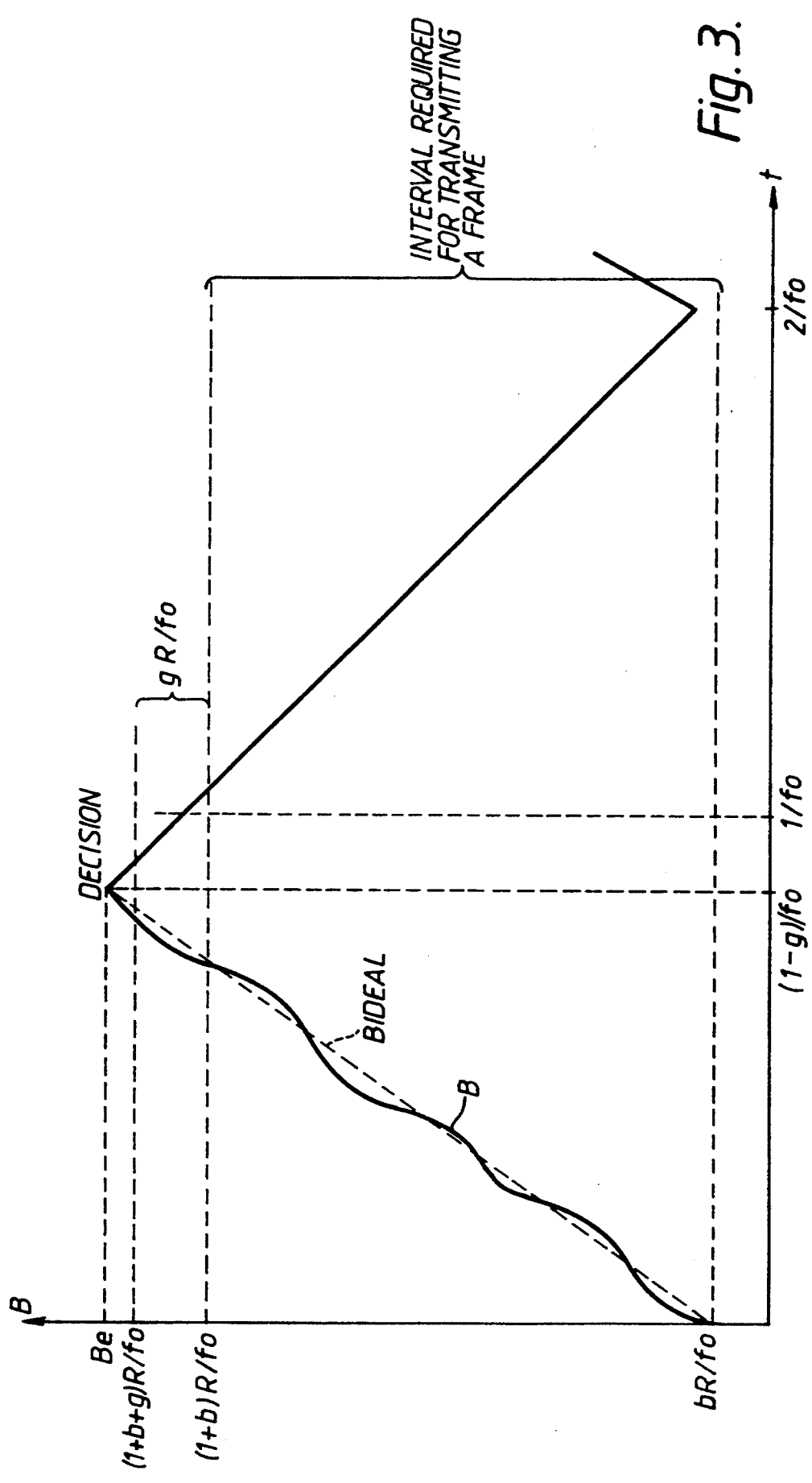
FIG. 3 shows the buffer store content as a function of time according to a preferred embodiment of the invention.

FIG. 3 of the drawings shows an example of how the content of the buffer store changes during operation of a preferred embodiment of the invention.

One frame is coded in $(1-g)/fo$ seconds, where g (where g is a nondimensional entity and $g/fo$ is in seconds) takes into consideration when the coding is terminated. During this time, the buffer store content increases to a value which is designated Be.

In the following $(k+g)/fo$ seconds $(k>k0)$, no bits are produced and the buffer store content is reduced. The rate of reduction is R which is sensed at the buffer store output by the control arrangement 6. It is then possible to calculate the value of k at the end of the coded frame The value of k must be such that, when the coding of the next frame commences, the buffer store content Bs lies in the interval $$bR/fo < Bs < (1+b)R/fo$$

that is $$k = \text{INT}\left[\frac{Be}{R/fo} - (g+b)\right]; k = \text{MAX}(k, k0)$$

"b" is a nondimensional entity used to define the minimum buffer store content $bR/fo$ using the bit rate R at the output of the buffer and the frame rate fo.

The value R/fo is measured by a computer at the output of the buffer store. This excludes, inter alia, parity bits from the error correction in FEC. The measurement is made in the time interval between the "new frame" signals. Thus the number of skipped frames k is determined utilising a value for Be which is obtained precisely when a frame has been coded.

The value R/fo is the lower limit selected for the buffer store content. In practice, this lower limit is set to a value that can be emptied from the buffer store in three frame intervals and that is greater than or equal to zero.

Instead of determining the value of k by means of the foregoing equation, a decision can be taken at the end of each frame interval. With this arrangement the content of the buffer store is designated Bs. If Bs is less than $(b+g)R/fo$, then the buffer store will be emptied in the next interval. A new frame will then be coded, assuming that k0 frames have been skipped as required by the decoder. Logically expressed:

If $k<k0$: skip next frame, set $k=k+1$;

or else

If $Bs>(1+b+g)R/fo$; skip next frame, set $k=k+1$;

or else code next frame, set $k=0$.

According to the present invention, the content B of the buffer store can also be regulated either by setting to zero, or skipping, certain components which are produced by the quantiser Q.

With one of these methods, the components produced at the output of the quantiser Q are suitably processed in the unit SKIP 1.

With the other of these methods, the components produced at the output of the quantiser Q are first swept in zig zag in the zig-zag scanner ZIG and are then processed in the unit SKIP 2.

The transformation coding and quantising process produces components which specify the different frequencies values. The high frequencies represent fine detail in the image. If, therefore, it is necessary to skip components or to set them to zero, then the components that will be selected to be skipped or set to zero will be those having high frequencies values.

The components produced at the output of the quantiser Q are in disarray with respect to the frequencies. The frequencies are sensed in the unit SKIP 1 and the components which represent frequencies above a frequency F are set to zero. Thus, the components which are set to zero, are not, therefore adding to the content in the buffer store. The method by which the frequency F is determined is given below.

With the switch S2 set in its upper position, the output of the unit SKIP 1 will by-pass the scanner ZIG and the unit SKIP 2 and will be applied to the input of the coding arrangement RL. Thus, the setting to zero of selected components at the output of the quantiser will be effected solely by the unit SKIP 1 under the control of the control arrangement 6. This process will, therefore, minimise the time during which the data bits are stored in the buffer store because it uses data which is not swept by the scanner ZIG.

Normally, the bit stream from the quantiser Q is swept in zig zag in a zig-zag scanner ZIG. The zig-zag scanner loads the data from the bit stream into a random-access memory and reads out the components in the order in which they will be transmitted, that is to say, in frequency order.

Thus the arrangement which includes the unit SKIP 2 in the zero setting process, makes use of the fact that the components come in frequency order and calculates the number of non-zeros of the components. When a certain number NON of non-zeros in a block have been sent, the rest of the components in the block are set to zero.

In order to determine the parameters F and NON, the content B of the buffer store and the bit rate R at the output of the buffer store are sensed by the control arrangement 6. The control arrangement 6 sends control signals F and NON to the zero-setting arrangements of SKIP 1 and SKIP 2.

It is desirable that the content of the buffer store is as small as possible in order to reduce delay, that is to say, the time during which the bits are stored in the buffer store. However, a lower limit $bR/fo$ is set for the buffer store content. Having defined a lower limit, it is then possible to define the ideal buffer content Bideal. When Be=B ideal, the content of the buffer store will be reduced to the lower limit $bR/fo$ at $k+1$ frame intervals. With the given format of the bit stream, the ideal buffer store content will be:

$$Bideal = (GOB - 1 + MB/33)/12 \times (k1 + g)R/fo + bR/fo$$

Bideal is consequently defined in the time period during which the frame is coded, that is to say, when GOB increases from zero to 12 and MB indicates thirty-third parts of GOB.

Sensing the actual content B in the buffer store makes it possible to calculate the difference B-Bideal. By forming intervals with the interval limits B0 to B2, it is possible to define different values for F and NON. It is also convenient to allow the step height QUANT in the quantiser to influence the parameters F and NON. The step height QUANT can also be made dependent on the difference B-Bideal. If QUANT is small, then this implies that more bits are wanted in the buffer store. Thus, it is desirable to have a small number of skipped components and the values for F and NON set high. If the step height QUANT is large, then the buffer store will require fewer bits and thus more components should be skipped.

If the transformation coding is in the INTRA mode, special values are also used for F and NON.

The different cases are specified in the following table:

| | | |
|---|---|---|
| $(B\text{-Bideal}) < B0 \rightarrow$ | $F = F0$ | $NON = N0$ |
| $B0 < = (B\text{-Bideal}) < B1 \rightarrow$ | $F = F1$ | $NON = N1$ |
| $B1 < = (B\text{-Bideal}) < B2 \rightarrow$ | $F = F2$ | $NON = N2$ |
| $B2 < = (B\text{-Bideal}) \rightarrow$ | $F = F3$ | $NON = N3$ |
| $QUANT < = Q0 \rightarrow$ | $F = F4$ | $NON = N4$ |
| $QUANT > = Q1 \rightarrow$ | $F = F5$ | $NON = N5$ |
| $INTRA = yes \rightarrow$ | $F = F6$ | $NON = N6$ |

The invention also relates to a device for carrying out the method.

The device according to the present invention is preferably constructed as an integrated circuit, for example, a VLSI circuit. The different parameters b, B0 to B2, F0 to F6, N0 to N6, Q0 to Q1 are stored in a BOOT-PROM.

The invention thus solves the buffer store control problem by skipping the coding of a number of frames and/or by setting to zero certain components in the bit stream. The method (SKIP 1) is less effective from the point of view of bit saving but involves shorter delay since it utilises data which are not swept in zig zag by the scanner ZIG. The other method (SKIP 2) is more effective for bit saving but requires zig-zag swept data.

It will be directly evident to persons skilled in the art that the invention outlined above could be used in a number of other applications and/or combined with other techniques.

I claim:

1. A method for image coding a video signal having a known frame rate comprising the steps of coding and quantising the video signal to effect digitisation and compression of the signal to form a bit stream having a bit rate determined by the transmission line on which the bit stream is to be transmitted, storing the bit stream in a buffer store before transmission, monitoring the content of the buffer store, sensing the rate of the bit stream at the output of the buffer store, calculating an ideal buffer store content, and setting to zero selected components of the bit stream at the output of a quantiser in dependence on the difference between the values of the monitored and ideal buffer store contents and/or skipping a number of frames between each coded frame, the number of skipped frames being selected so that the content of the buffer store is not reduced to a level below a selected lower limit before the next frame is coded.

2. A method as claimed in claim 1, wherein the number of skipped frames is set, at least, to a value which is determined by the decoder of a receiver to which the bit stream is transmitted.

3. A method as claimed in claim 2, wherein the determination of the number of skipped frames is effected in accordance with the following formula at a time when a frame has been coded and the content of the buffer store at that time has not been reduced to a level below the selected lower limit:

$$k = \text{INT}\left[\frac{Be}{R/fo} - (g + b)\right]; k = \text{MAX}(k, k0)$$

where
k is the number of skipped frames,
k0 is the number of skipped frames,
Be is the buffer store content,
R is the bit stream rate,
fo is the frame rate of the video input signal, and
g takes into account when the coding of a frame is terminated.

4. A method as claimed in claim 1 or claim 2, wherein the number of skipped frames is determined at the beginning of each frame interval and wherein the buffer store is emptied and the following frame is skipped if the content of the buffer store at the beginning of a frame interval is of such a value that the buffer store will not be emptied below the selected lower limit, that is to say
if k<k0: skip next frame, set k=k+1;
or else
if Bs>(1+b+g) R/fo; skip next frame, set k=k+1;
or else
code next frame, set k=0
where
Bs is the buffer store content at the beginning of a frame, and
g takes into account when the coding of a frame is terminated.

5. A method as claimed in claim 1, wherein the selected lower limit is less than the value of the buffer store content that can be emptied from the buffer store in three frame intervals and greater than or equal to zero.

6. A method as claimed in claim 1, wherein the selected components of the bit stream that are set to zero are those which represent frequencies higher than a predetermined value.

7. A method as claimed in claim 6, wherein a certain number of non-zero components in a block are transmitted and wherein the remaining components in the block are set to zero.

8. A method as claimed in claim 7, wherein the bit stream is scanned after quantisation, wherein the components of the scanned bit stream that are indicative of frequency values are arranged in ascending order of frequency values, wherein the number of non-zeros of the components are calculated, and wherein some of the non-zero components are transmitted and the remaining components are set to zero.

9. A method as claimed in claim 7, wherein the number of transmitted non-zeros is a function of the step height in the quantiser.

10. A method as claimed in claim 1, wherein the ideal buffer store content is calculated as follows:

$$Bideal = (GOB - 1 + MB/33)/12 \times (k1 + g)R/fo + bR - /fo$$

where
GOB is the number of the block group,
MB is the number of the macroblocks,
k1 is the number of skipped frames which are determined by the coder,
R is the bit stream rate,
bR/fo is the minimum allowed content in the buffer store,
fo is the frame rate of the video signal, and
g takes into account when the coding of a frame is terminated.

11. A method for image coding a video signal having a known frame rate comprising the steps of coding and quantising the video signal to effect digitisation and compression of the signal to form a bit stream having a bit rate determined by the transmission line on which the bit stream is to be transmitted, storing the bit stream in a buffer store before transmission, monitoring the content of the buffer store, sensing the rate of the bit stream at the output of the buffer store, calculating an ideal buffer store content, scanning the bit stream after quantisation, arranging the components of the scanned bit stream that are indicative of frequency values in ascending order of frequency values, calculating the number of non-zeros of the components, and transmitting some of the non-zero components and setting the remaining components to zero.

12. A method for image coding a video signal having a known frame rate comprising the steps of coding and quantising the video signal to effect digitisation and compression of the signal to form a bit stream having a bit rate determined by the transmission line on which the bit stream is to be transmitted, storing the bit stream in a buffer store before transmission, monitoring the content of the buffer store, sensing the rate of the bit stream at the output of the buffer store, calculating an ideal buffer store content, and skipping a number of frames between each coded frame, the number of skipped frames being selected so that the content of the buffer store is not reduced to a level below a selected lower limit before the next frame is coded.

13. A method as claimed in claim 12, wherein the number of skipped frames is determined at the beginning of each frame interval and wherein the buffer store is emptied and the following frame is skipped if the content of the buffer store at the beginning of a frame interval is of such a value that the buffer store will not be emptied below the selected lower limit, that is to say
if k<k0: skip next frame, set k=k+1;
or else
if Bs>(1+b+g) R/fo; skip next frame, set k=k+1;
or else
code next frame, set k=0
where
Bs is the buffer store content at the beginning of a frame, and
g takes into account when the coding of a frame is terminated.

14. A device for image coding of a video signal having a known frame rate comprising an arrangement for coding and quantising the video signal to effect digitisation and compression of the signal to form a bit stream having a bit rate determined by the transmission line on which the image coded signal is transmitted, a buffer store for storing the bit stream before transmission and control means for monitoring the content of the buffer store and the bit rate of the signal at the output of the buffer store, and for calculating an ideal buffer store content, and setting to zero selected components of the bit stream at the output of a quantiser in dependence on the difference between the values of the monitored and ideal buffer store contents and/or skipping a number of frames between each coded frame, the number of skipped frames being selected so that the content of the buffer store is not reduced to a level below a selected lower limit before the next frame is coded.

15. A device as claimed in claim 14, wherein the device includes a first zero setting arrangement, the input of which is connected to the output of the quantiser and the output of which is connected to the input of a scanning arrangement and wherein the components of the bit stream that are indicative of frequency values which are higher than a predetermined value are set to zero by the first zero setting arrangement under the control of the control means.

16. A device as claimed in claim 15, wherein the device includes a first switch interposed between the quantiser and the first zero setting arrangement and wherein the first switch is adapted to effect the removal of a number of frames from the bit stream under the control of the control means.

17. A device as claimed in claim 14 or 15, wherein the device includes a second zero setting arrangement, the input of which is connected to the output of a scanning arrangement and the output of which is connected to a coding arrangement and wherein a number of the non-zero components of the scanned bit stream at the output of the scanning arrangement are transmitted to the coding arrangement whilst the remaining components are set to zero by the second zero setting arrangement under the control of the control means.

18. A device as claimed in claim 17, wherein the device includes a second switch the operation of which is under the control of the control means and wherein the second switch is adapted to connect the output of the first zero setting arrangement to the output of the second zero setting arrangement.

19. A device as claimed in claim 14, wherein the device is in the form of an integrated circuit.

20. A device as claimed in claim 14, wherein the device also includes a BOOT-PROM for storing the data from which the required parameters for effecting frame skipping and/or zero setting are derived.

* * * * *